(12) United States Patent
Abel et al.

(10) Patent No.: US 8,135,024 B2
(45) Date of Patent: Mar. 13, 2012

(54) METHOD AND SYSTEM TO REDUCE INTERCONNECT LATENCY

(75) Inventors: Francois G Abel, Rueschlikon (CH); Alan F Benner, Poughkeepsie, NY (US); Richard R Grzybowski, Corning, NY (US); Brewster Roe Hemenway, Jr., Painted Post, NY (US); Ilias Iliadis, Rueschlikon (CH); Rajaram Krishnamurthy, Adliswil (CH); Ronald P Luijten, Horgen (CH); Cyriel Minkenberg, Adliswil (CH)

(73) Assignee: Corning Incorporated, Corning, NY (US)

( * ) Notice: Subject to any disclaimer, the term of this patent is extended or adjusted under 35 U.S.C. 154(b) by 668 days.

(21) Appl. No.: 11/402,091

(22) Filed: Apr. 10, 2006

(65) Prior Publication Data

US 2007/0110087 A1 May 17, 2007

Related U.S. Application Data

(60) Provisional application No. 60/736,779, filed on Nov. 14, 2005.

(51) Int. Cl.
*H04L 12/56* (2006.01)
(52) U.S. Cl. ............... 370/412; 370/389; 370/413
(58) Field of Classification Search .............. None
See application file for complete search history.

(56) References Cited

U.S. PATENT DOCUMENTS

| | | | |
|---|---|---|---|
| 5,500,858 A | 3/1996 | McKeown | 370/60 |
| 6,647,019 B1 | 11/2003 | McKeown et al. | 370/422 |
| 6,920,106 B1 * | 7/2005 | Chou et al. | 370/229 |
| 7,352,741 B2 * | 4/2008 | Eberle et al. | 370/389 |
| 2002/0012344 A1 * | 1/2002 | Johnson et al. | 370/389 |
| 2002/0039364 A1 * | 4/2002 | Kamiya et al. | 370/389 |
| 2003/0156597 A1 * | 8/2003 | Eberle et al. | 370/447 |
| 2004/0136334 A1 * | 7/2004 | Heiman et al. | 370/316 |
| 2005/0190795 A1 | 9/2005 | Abel et al. | 370/498 |
| 2005/0198187 A1 * | 9/2005 | Tierney et al. | 709/214 |
| 2005/0201400 A1 * | 9/2005 | Park et al. | 370/412 |

FOREIGN PATENT DOCUMENTS

WO  WO01/95661 A1  12/2001

OTHER PUBLICATIONS

N. McKeown, "Scheduling Algorithms for Input-Queued Switches," PhD. Thesis, University of California at Berkeley, 1995.

* cited by examiner

*Primary Examiner* — Robert Scheibel
(74) *Attorney, Agent, or Firm* — Gregory V. Bean (57) ABSTRACT

A method and system for reducing arbitration latency employs speculative transmission (STX) without prior arbitration in combination with routing fabric scheduled arbitration. Packets are sent from source locations to a routing fabric through scheduled arbitration, and also through speculative arbitration, to non-contentiously allocate outputs that were not previously reserved in the routing fabric to the speculatively transmitted packets.

19 Claims, 9 Drawing Sheets

METHOD AND SYSTEM TO REDUCE INTERCONNECT LATENCY

This application claims the benefit of U.S. Provisional Application No. 60/736,779, filed Nov. 14, 2005, entitled "METHOD AND SYSTEM TO REDUCE INTERCONNECT LATENCY."

This invention was made with Government support under Contract No. W-7405-ENG-48 awarded by DOE/NNSA. The Government has certain rights in this invention.

BACKGROUND OF THE INVENTION

1. Field of the Invention

The present invention relates to the field of packet switching, and more particularly to the field of input-queued packet-switch architectures, with particular applicability to computer interconnection networks.

2. Description of the Related Art

Advances in transmission technologies and parallelism in communications and computing are constantly pushing the envelope of bandwidth available to transfer information data. For instance, advances such as wavelength-division multiplexing (WDM) and dense WDM (DWDM) greatly increase available bandwidth by multiplexing large numbers of channels onto a single fiber. Each individual channel operates at the Optical Carrier (OC-x) rates OC-48 (2.5 Gb/s), OC-192 (10 Gb/s), or OC-768 (40 Gb/s). Using state-of-the-art DWDM techniques, a single fiber can carry over 5 terabit of data per second.

At the same time, the gap is widening between the increasingly high speeds provided by such advances and the speeds at which available switches are capable of switching. While optical switches provide such theoretical advantages of routing through free space, minimal signal attenuation over large distances, and the elimination of conversion between the optical domain to the electrical domain and back again, current all-optical type switches are relatively slow or prohibitively expensive. In addition, optical storage of information is very cumbersome and often impractical. Until the shortcomings of optical switching are overcome, electronic switches will continue to play a dominant role in packet switching schemes.

Typically, a backplane switch, or more generally a routing fabric is used to interconnect boards. In networking systems, these boards are called line cards, and in computing and storage, they are often called adapters or blades. An increasingly broad set of systems uses backplanes to connect boards, such as telecommunication switches, multiservice provisioning platforms, add/drop multiplexers, digital cross connects, storage switches, routers, large enterprise scale switches, embedded platforms, multiprocessor systems and blade servers.

When information data is transmitted from a source to a destination through an interconnect system, the information often is first segmented into data packets. Each data packet typically includes a header, payload and tail sections, and is further segmented into smaller units. A data packet is switched through a routing fabric simultaneously with other data packets originating from other sources. Many current packet switch systems, including those employed in interconnects for parallel computers, Internet routers, S(t)AN networks, Asynchronous Transfer Mode (ATM) networks, and especially in optical networks, use an input-queuing arrangement, include queues sorted per output at every line card (such an arrangement, often called virtual output queuing (VOQ), eliminates head-of-line blocking inherent to the use of FIFO queues), a crossbar routing fabric, and a centralized scheduler (e.g., arbiter or arbitration unit), that allocates switching resources and arbitrates among the queues.

Figure 1:
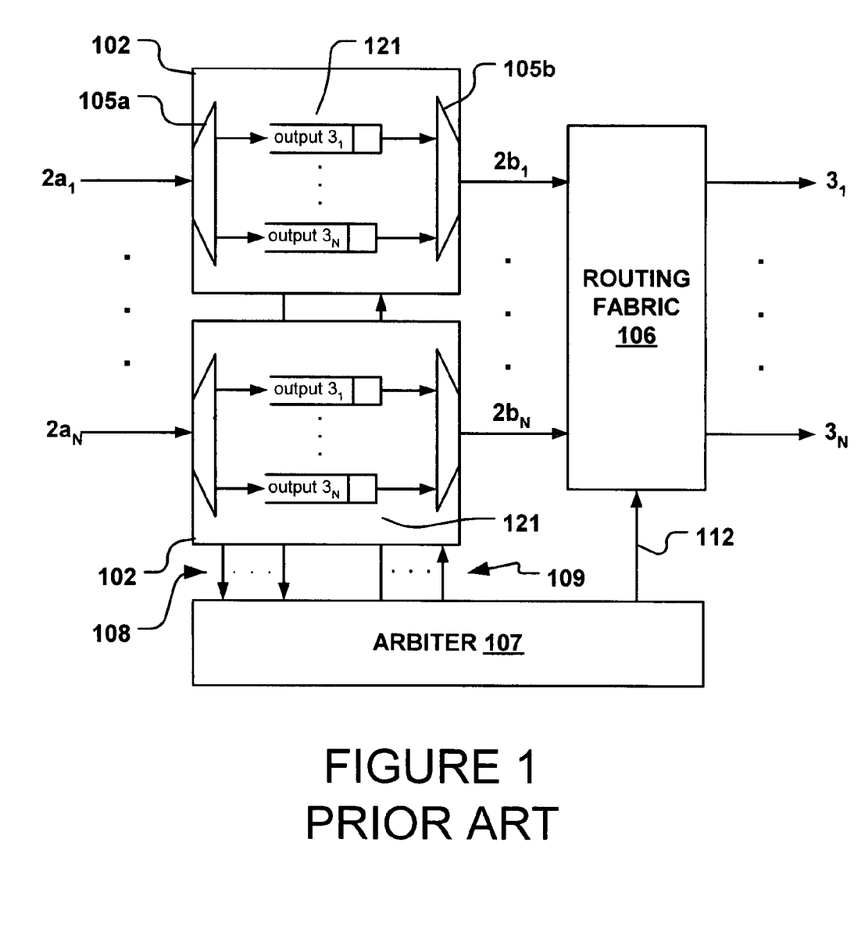
FIG. 1 illustrates a high level overview of a conventional system including virtual output buffering.

FIG. 1 shows a conventional switching arrangement utilizing VOQ architecture. In the FIG. 1 arrangement, data packets (e.g., cells, frames or datagrams) are received from each of N data links $2a_1$ to $2a_N$ of respective lines cards 102. The data packets are sorted per output $3_1$ to $3_N$ of a routing fabric 106 (shown as an N×N crossbar) into one of N buffers of N buffer groups 121 via a multiplexer 105a. That is, at each input line card 102, a separate queue is maintained for each output $3_1$ to $3_N$, resulting in $N^2$ VOQ's at the input side of the routing fabric 106. An arbiter 107 is provided to manage contention between data packets pursuing a same output of the router fabric 106 and to match the inputs to the outputs. The arbiter 107 communicates with each of the line cards along control paths 108, 109 and provides a switching configuration to the routing fabric 106 along control path 112. Typically, the arbiter 107 is located physically close to the routing fabric 106.

The arbiter 107 performs processes involving allocating input ports and output ports in a non-conflicting manner to packets waiting in the buffers of the buffer groups 121. These processes include allocation and arbitration. Allocation determines a matching between the inputs $2b_1$ to $2b_N$ and the outputs $3_1$ to $3_N$ of the routing fabric 106 such that at most one packet from each buffer group 121 is selected for output to at most one output resource. Arbitration resolves multiple requests for a single output resource $3_1$ to $3_N$ and assigns a single one of the outputs to one of a group of requesters. In the conventional arrangement of FIG. 1, the arbiter 107 receives requests for switch access from the line cards 102 on the control path 108. The arbiter 107 computes a match, based on received requests and a suitable matching algorithm, to determine which of the inputs $2b_1$ to $2b_N$ is allowed to forward a data packet to which output in each of a number of time slots. Each line card 102 winning access (i.e., granted access) is sent a control message along the control path 109 to inform the line card 102 that it is permitted to transmit a data unit, such as a packet, in a particular time slot or switching cycle to a specified output. During the time slot, the arbiter 107 transmits the computed switching configuration to the routing fabric 106, and each winning line card 102 releases a unit of a data packet from a queue in its buffer group 121 through demultiplexer 105b and transmits the data unit along its corresponding input $2b_1, \ldots,$ or $2b_N$ to the routing fabric 106. Each data packet is then transmitted through the routing fabric 106 along the path configured by the arbiter 107 to the requested one of the outputs $3_1, \ldots,$ or $3_N$.

As can be seen, there are two basic paths of communication in such input-queuing systems: control paths, which include flow of control information from the line cards to the arbiter (e.g. requests) and back to the line cards (e.g. grants), and data paths, which include flow of data packets from the input line cards through the crossbar and to the output line cards.

While the conventional packet switching arrangement illustrated in FIG. 1 shows a routing fabric 6 having only one-way communication paths, it will be appreciated that this general concept includes bi-directional data and control paths. For instance, each data link $2b_1$ to $2b_N$ and respective output $3_1$ to $3_N$ shown in FIG. 1 can be represented as a bi-directional link, such that a line card associated with each buffer group 121 also includes both ingress and egress buffers. In such a case, line cards 102 can be viewed as both source locations and destination locations for transmitting data packets by way of the routing fabric. Similarly, the request, grant, and links $2a_1$ to $2a_N$ also can be represented as bi-directional links.

With increasing capacity, the physical size of packet switches also is growing. At the same time, the duration of a single packet or cell (T=L/B, where L is the length of a packet in bits, and B the link rate in bits per second) is shrinking because although the line rate increases, packet sizes remain substantially constant. These trends directly imply a significant jump in the switch-internal round trip (RT) measured in packet times. This effect hits centrally-arbitrated input-queued switches doubly hard, because the minimum transit latency in such a switch is composed of two latencies: (1) the latency of submitting a request to the arbiter and waiting until the corresponding grant arrives, which includes the time-of-flight to and from the arbiter and the time to arbitrate; and (2) the latency of serialization/deserialization (SerDes), transmission, and time-of-flight to send the packet through the switch. Roughly speaking, these latencies amount to a minimum latency of 2 (RT) packet times, which is double that of a similar switch, but one having a buffered routing fabric.

Because these latencies have become a relevant issue only recently, they have received very little attention. In practice, a preferred solution has been to physically locate boards, such as line cards having input queues (typically organized in a VOQ fashion), close to the routing fabric (e.g., a switch core including a crossbar and arbiter). However, current packaging and power constraints prohibit placing a large number of line cards close to the switch core. As a result, such conventional arrangements cannot address ever-increasing demands for more bandwidth by simply increasing the number of line cards located at the routing fabric.

Figure 2:
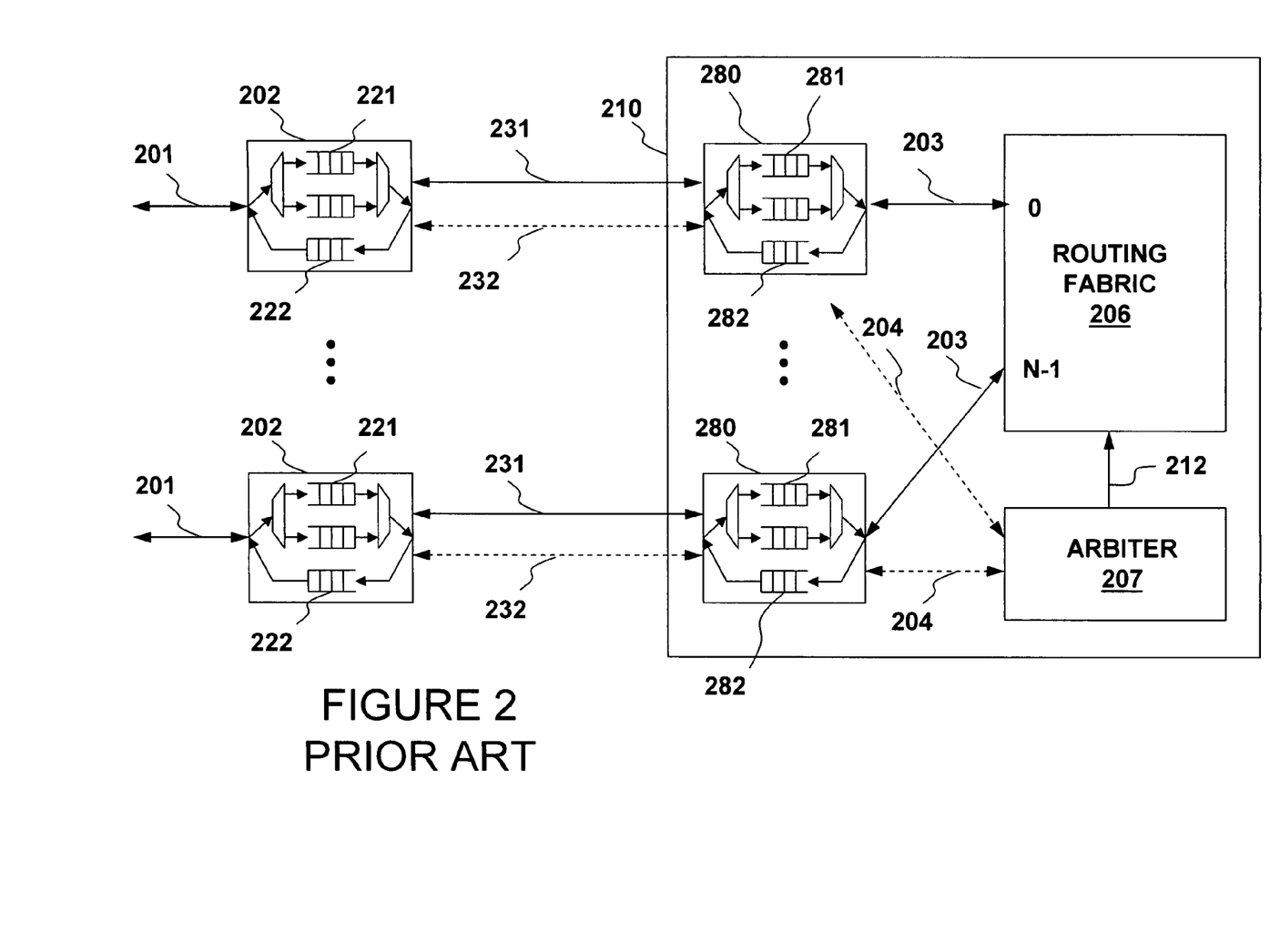
FIG. 2 shows a non-optimized conventional system using line-card-to-switch (LCS) protocol.

U.S. Pat. No. 6,647,019 to McKeown et al. attempts to increase the number of line cards, and thus the aggregate system bandwidth, by physically separating the line cards from the routing fabric. The bulk of buffering and processing is implemented on the physically remote line cards. FIG. 2A illustrates a system according to this approach.

As shown in FIG. 2, the system includes a switch core 210 and a plurality of line cards 202 physically located away from switch core 210. Each line card 202 includes an ingress VOQ buffer group (queue) 221 and an egress buffer 222. The switch core 210 includes a plurality of port modules 280 (i.e., "switch ports"), a parallel sliced self-routing crossbar-type fabric module 206 and a centralized arbiter module 207. Data packets are transmitted and received along data links 231 between the line cards 202 and switch ports 280, and along data links 203 between the switch ports 280 and the crossbar-type routing fabric 206. Each of the line cards 202 includes a buffer group 221 for storing packets being sent in the forward path and an egress buffer 222 for storing packets in the return path. Control messages are sent and received along control paths 232 between the line cards 202 and switch ports 280, and along control links 204 between the switch ports 280 and the arbiter module 207. The arbiter 207 determines a suitable configuration for each time slot and provides the configuration to the routing fabric 207 along configuration link 212. For each ingress port of the switch core 210, a small buffer 281 having VOQs is located close to the switch core 210 to minimize the RT between the VOQs 221 and the arbiter 207. This is achieved by way of a line card-to-switch (LCS) protocol, which enables lossless communication between the line cards 202 and the switch ports 280.

The main drawback of the McKeown et al. approach is that both the line cards 202 and the switch ports 280 contain buffers, even though only a small amount of buffering, namely, enough packets to cover one RT, is required in the switch ports 280. These buffered switch ports add cost, card space, electrical power, as well as latency (e.g., additional SerDes and buffering). They also duplicate functionality already present in the line cards 202.

Even using the approach described in the McKeown et al. patent, it would be difficult in practice to achieve a round-trip time between the switch ports 280 and the arbiter module 207 that is shorter than one cell time. Moreover, in the specific case of a switch fabric that comprises optical links from line cards to switch core (to cover the long distance from line cards to switch core) and an optical routing fabric, the switch ports 280 would require additional electrical-to-optical and optical-to-electrical conversions for buffering in electrical/CMOS chips because optical buffers are currently not practically or economically feasible. Such added conversion circuitry would significantly increase the cost and complexity of the system.

Another approach to reducing interconnection network latency, presented in W. J. Daily et al., "Principles and Practices of Interconnection Networks," Morgan Kaufman, 2004, pages 316-318, involves "speculation with lookahead." As described in Dally et al., a router's matching arbiter uses speculation with lookahead to look deeper into an ingress VOQ queue than the first member (head of line, or HoL) and allocate ahead of time some switch resources with the expectation (hope) that grants will be offered for those subsequent packets. This approach attempts to reduce the pipeline to as few stages as possible by enabling the router to perform some matching and setup tasks in parallel. While speculation with lookahead benefits queued packets that dwell in the ingress VOQ, and packets that have already made transmission requests that cannot be served immediately by the arbiter, it does not speed the transmission of packets whose transmission requests have not yet been received by the arbiter for consideration and/or packets that have just arrived at the ingress VOQ.

Further, speculation with lookahead addresses latency mostly in the arbiter algorithms and does not address the usually larger transmission time latency from the transmitter to the switch fabric. Earlier concepts of double and even triple speculation (e.g., see page 317 of Dally et al.), which rely on internal switch speedup and light switch loading to speculatively allocate even more of the switch's resources, fail in most applications. In many conventional strictly non-blocking switch fabrics, the internal fabric is internally partitioned into several successive switching stages. In double and triple speculation, those stages are incrementally set (allocated) for the speculative load. Only when the speedup is extreme or the load is light do speculations in these schemes regularly succeed in granting transmission through the entire multistage fabric. As the load increases, this approach to speculative allocation can hurt performance because it wastefully reserves resources that would be better allocated to successfully arbitrated requests.

Additionally, all of the above-described systems still suffer from the first RT latency in which the line card must wait until a grant arrives after submitting a request for an output resource.

Thus, there remains a need in the art for more efficient, less complex and lower cost ways to reduce latencies associated with routing fabrics in interconnect systems.

SUMMARY OF THE INVENTION

Accordingly, the present invention is directed to a method and apparatus that substantially obviates one or more of the shortcomings or problems due to the limitations and disadvantages of the related art.

The present invention includes both a system and a method for transmitting information units that reduces overall latency incurred by scheduled arbitration in systems employing routing fabrics. The method is particularly suited in systems including switched fabrics in which data packets are sent with or without scheduled arbitration from a plurality of sources to inputs of a routing fabric, which switches the input packets to specified routing fabric outputs.

In an aspect of the present invention, a method includes a step of sending at least one data packet according to the result of the prior arbitration (i.e., the scheduled arbitration) if a result of a scheduled arbitration is present, and if no scheduled arbitration result is present, selecting a data packet to transmit speculatively. The method also includes simultaneously issuing a speculative request that includes an output identifier of the selected data packet and sending the selected packet to the routing fabric.

In another aspect of the invention, a system for transmitting data packets with or without scheduled (prior) arbitration from a plurality of inputs to a plurality of outputs of a routing fabric includes a mechanism for sending at least one data packet according to the result of a scheduled arbitration, if a result of a prior arbitration is present, and a mechanism for selecting a data packet to transmit speculatively, and simultaneously issuing a speculative request that includes an output identifier of the selected data packet and sending the selected packet to the routing fabric, if no scheduled arbitration result is present.

Another aspect of the invention involves a system for managing the flow of information units among plural locations. The system includes a plurality of inputs for receiving requests for access to a switching fabric to transmit information units from source locations to destination locations. The requests for access include requests for scheduled arbitrated grant of access and requests for speculative access without prior arbitrated grant. Each request also includes an indication of a destination location to which to transfer an associated information unit. The system includes an arbiter for determining a conflict-free allocation of the switching fabric resources for a group or subgroup of the requests for scheduled arbitration grant of access. The system includes a speculative arbiter for receiving the speculative access requests at a time in which the determined group of requests is to be next applied to the switching fabric, and granting or denying the received speculative requests based on the determined allocation.

Yet another aspect of the invention is facilitating an increase in speed of transmission of data packets just arriving at an ingress queue without the need to pre-allocate or reserve switching resources, which otherwise would be wasted if a grant ultimately is denied.

Another aspect of the invention involves reducing average latency by way of reducing an amount of roundtrip transmissions between packet source and routing fabric. For instance, each successful speculative transmission of a packet saves at least one round trip (i.e., from transmission of request until reception of grant) that would otherwise be required to send the packet through a routing fabric.

Additional aspects and advantages of the invention will be set forth in the description that follows, and in part will be apparent from the description, or may be learned from practice of the invention. The aspects and advantages of the invention will be realized and attained by the system and method particularly pointed out in the written description and claims hereof as well as the appended drawings.

It is to be understood that both the foregoing general description and the following detailed description are exemplary and exemplary only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate exemplary embodiments of the invention that together with the description serve to explain the principles of the invention. In the drawings:

FIG. 6b is a more detailed example of egress buffer shown in FIG. 6a.

DETAILED DESCRIPTION

These and other aspects of the invention will now be described in greater detail in connection with examples that are illustrated in the accompanying drawings.

As described above in connection with the related art, central arbitration arrangements achieve high maximum throughput, but incur the penalty of the arbitration latency, especially at low to medium utilization. The present invention addresses such latencies using a novel kind of speculation called speculative transmission (STX). The concept of STX described herein is related to the basic concept behind ALOHA and Ethernet, in which packets are transmitted without prior arbitration (i.e., there is speculation on the success of a given transmission) over a shared medium. However, in the present invention, this concept is applied in the context of a switched medium to eliminate the arbitration latency. Because operating a packet switch using only speculative transmissions would lead to frequent packet collisions, resulting in catastrophic performance at medium to high utilization, the present invention combines speculative transmission and arbitration to obtain the advantages of both concepts, i.e., high maximum throughput and lower latency at low to medium utilization.

The present invention reduces arbitration latency by employing STX without prior arbitration in combination with routing fabric arbitration without implementing an additional stage of buffering close to the routing fabric. Moreover, the present invention allows very deep pipelining of the speculative operations, such that round trips that are (much) larger than the packet duration can be dealt with effectively. The present invention substantially reduces or eliminates the average latency incurred by arbitration in switching fabrics, thereby achieving a 50% or lower decrease in overall latency.

In contrast to the speculation schemes of the prior art, which involve pre-allocations of switch resources that often are wasted, the efficient non-blocking single-stage broadcast nature of the routing fabric described herein does not pre-allocate such resources. In other words, the present invention implements a single-stage selector in the switching fabrics, and thus avoids wasting switch resources because fabric resources are not actually speculatively set.

The present invention addresses issues related to STX selection policy, collisions, retransmission, out-of-order delivery, resequencing, duplicate delivery, retransmission and resequencing window sizing. However, it should be understood that other issues and particularities related to switching fabrics that would be pertinent to any particular application of the present invention would be readily appreciated by those skilled in the art.

Figure 3:
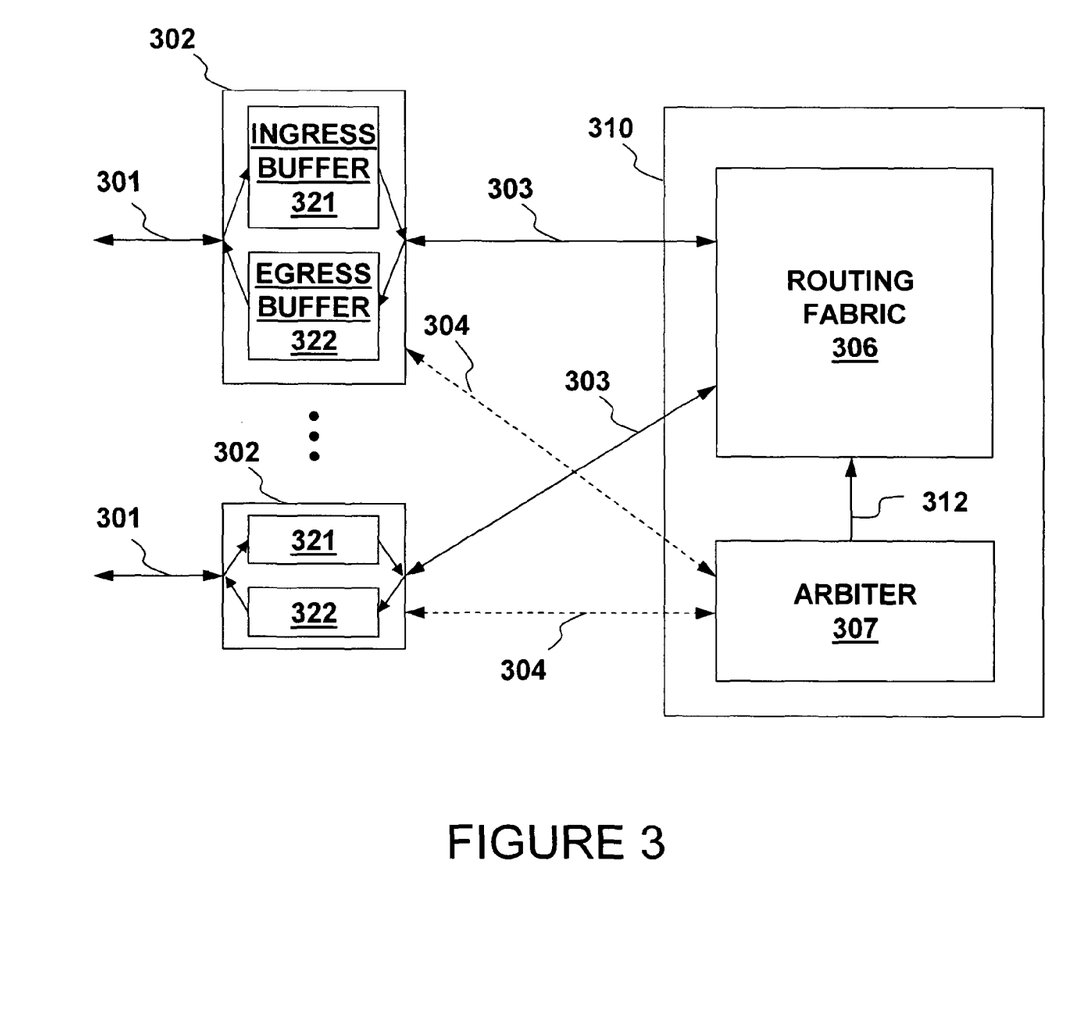
FIG. 3 shows an exemplary system in accordance with the present invention.

FIG. 3 illustrates an exemplary system according to the present invention. As shown in FIG. 3, the system comprises N bi-directional full-duplex ingress/egress data links 301 that are connected to N line cards 302. Data packets having payload information, and a header including information indicating the requested packet destination, are transmitted and received over the data links 301. Each line card 302 is connected to a switch core 310 through bi-directional full-duplex fabric-internal data links 303. The switch core 310 comprises a routing fabric 306, which is shown by way of example as a crossbar including N input and N output ports. Each line card 302 also is connected to a centralized allocation and arbitration unit 307 with a dedicated bi-directional control link 304, which exchanges control messages (including, for example, requests and grants) between the line cards 302 and the arbiter 307. The arbiter 307 is connected to crossbar 306 through configuration link 312. Each line card 2 further comprises an ingress buffer unit 321 and an egress buffer unit 322. The organization and function of arbiter 307, ingress buffer unit 321 and egress buffer unit 322 are discussed below in further detail with reference to FIGS. 4 to 7.

The present invention may be utilized with other types of routing fabrics. It is, however, especially suited for crossbar-based switches. Thus, while the system illustrated in FIG. 3 is described in connection with a switch core including crossbar-based switch for the purpose of illustrating a preferred example, those skilled in the art will appreciate that the present invention finds application in a number of switching fabric architectures.

A property of a crossbar-type switch is that, at any time, an input can only be connected to one output, and vice versa. That is, there is a one-to-one matching between inputs and outputs of the switch. To obtain good performance in terms of latency and throughput, a matching is typically computed by a centralized allocation and arbitration unit. Additionally, the allocation and arbitration unit resolves contentions for a single output resource of the switch. In the exemplary system shown in FIG. 3, the arbiter 307 performs these allocation and arbitration functions. While the arbiter 307 depicted in FIG. 3 is shown as a single unit, it is to be understood that functions of allocation and arbitration may be carried out by more than one hardware unit and/or one or more hardware units operating in conjunction with program instructions.

The arbiter 307 receives requests for output resources from the line cards 302. A request includes an output port identifier, which indicates that the line card 302 that originated the request wishes to transmit a packet to a specific output port. Based on the received requests, the arbiter 307 computes a suitable one-to-one matching between input and output ports, which is equivalent to a bipartite graph-matching problem. Based on the computed matching, the arbiter 307 returns the corresponding grants to the line cards 302, where a grant comprises an output port identifier meaning that the line card 302 receiving this grant is allowed to transmit a packet to this specific output port. Optionally, when no output resource is available for a particular request, the arbiter 307 may return an acknowledgment corresponding to a denied request. When a line card 302 receives a grant, it dequeues a packet from the corresponding VOQ of ingress buffer unit 321 and transmits it on data link 303 to the crossbar 306. The crossbar 306 routes the incoming packets to the data links 303 according to the configuration (i.e., the matching) computed by the arbiter 307 and applied via the configuration link 312.

Figure 4:
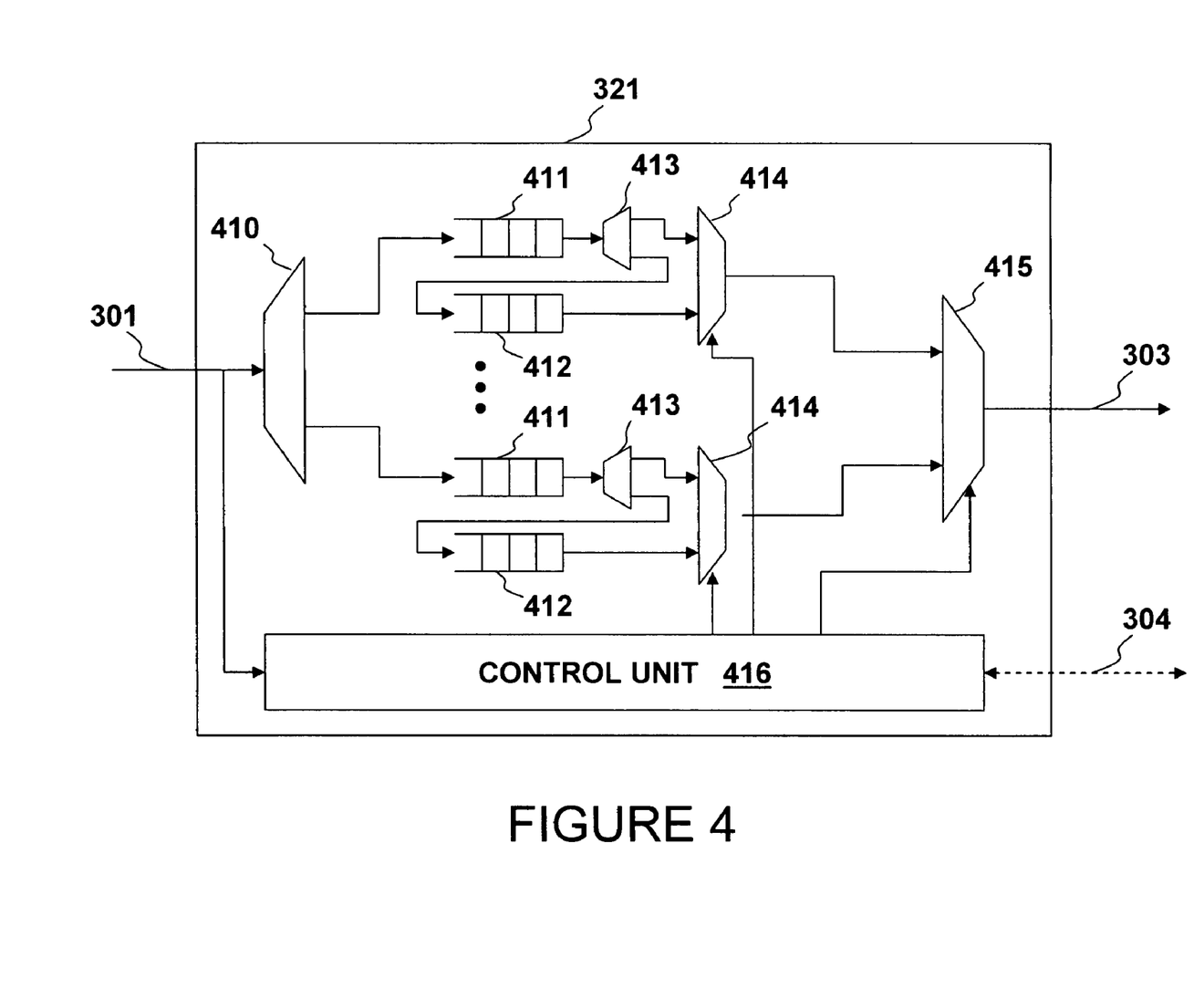
FIG. 4 is a representation of an ingress buffer unit in accordance with an example of the present invention.

FIG. 4 shows a more detailed representation of ingress buffer unit 321. The ingress buffer unit 321 includes an input demultiplexer 410, a plurality of virtual output queues (VOQs) 411, one corresponding to every output, a plurality of retransmission (RTX) queues 412, one corresponding to every output, a plurality of demultiplexers (these demultiplexers actually also have a duplication function in addition to a routing function) 413, one for every VOQ 411, a plurality of multiplexers 414, one for every VOQ 411, an output multiplexer 415, and a control unit 416.

In operation, packets arrive on input data link 301 connected to the ingress buffer unit 321 and the demultiplexer 410 routes incoming packets to the corresponding VOQ 411 in accordance with their respective destinations (output ports). The arrival of the packet also is communicated to the control unit 416. The control unit 416 sends requests to the arbiter unit 307 and receives grants from the arbiter unit 307 via control channel 304. When sequence numbers are required for the reliable delivery scheme, the control unit 416 assigns subsequent sequence numbers to subsequent packets destined to the same output. Requests for scheduled arbitration and speculative requests, and grants and acknowledgments, all comprise an output identifier. Speculative requests, grants, and acknowledgments may additionally include a sequence number. For example, certain types of reliable delivery (RD) methods, some of which are described later, may require that data packets transmitted as a result of a scheduled arbitration and data packets speculatively transmitted each have a sequence number.

The system comprises two modes of transmission, namely, arbitrated transmission (i.e., transmission resulting from scheduled arbitration) and speculative transmission (STX). The scheduled arbitration mode of transmission is known from the prior art. For instance, see C. Minkenberg et al., IP.com, Jun. 3, 2004, article number IPCOM000028815D, the entire contents of which is incorporated herein by reference. The present invention addresses the speculative transmission mode and the interaction between the scheduled arbitration and speculative transmission modes. This is accomplished by distinguishing between requests for scheduled arbitration and the corresponding grants on one side, and speculative requests and the corresponding positive and negative acknowledgements on the other.

Returning to FIG. 4, in a preferred embodiment, a line card 302 is eligible to perform a speculative transmission if and only if it does not receive any grant for scheduled arbitration transmission in a given time slot. When no grant is received, the control section 416 selects, according to a given policy, a non-empty VOQ 411 from which one packet is dequeued for speculative transmission. This policy can be, for example, random, round robin, oldest cell first, youngest cell first, etc. In a preferred embodiment, a policy is selected such that the latency gain is maximized. For example, policies that prefer newer arrivals, such as youngest cell first, tend to maximize latency gain.

The selected packet is stored in the retransmission buffer 412 via mux 413 and transmitted towards the crossbar 306 on data link 303 via muxes 413, 414, 415. Simultaneously, control section 416 sends a corresponding speculative transmission request comprising the output identifier via control link 304 to the arbiter 307. The purpose of storing the packet in retransmission buffer 412 is to allow a retransmission of the packet in case the speculative transmission fails. A line card 302 also may issue a request for scheduled arbitration seeking a grant and a speculative request simultaneously. In a preferred embodiment, packets stored in a retransmission queue 412 would not be eligible for speculative transmission, because they have already been transmitted speculatively once. That is, little or no advantage would be gained in resending failed STX packets speculatively because it would be highly likely that the potential latency advantage has already been lost.

If a line card 302 receives a grant by way of scheduled arbitration for a given output in a given time slot, this line card 302 would be eligible to transmit a packet for this output in the current time slot. The control unit first checks the occupancy of the corresponding retransmission queue 412. If it is not empty, one packet is dequeued from this retransmission queue 412 and is retransmitted on data link 303 to the crossbar 306 via muxes 414 and 415. If the retransmission queue 412 is empty, the control unit checks the occupancy of the corresponding VOQ 411. If retransmission queue 411 is not empty, one packet is dequeued from this VOQ 411 and transmitted on data link 303 to the crossbar 306 via the multiplexers 413, 414 and 415. It is to be understood that packets waiting in the RTX queue 412 usually would have priority over the packets in the corresponding VOQ 411 when a grant arrives. This is to ensure that failed STX packets are quickly delivered to their destination. However, priority also may depend on other factors, such as the nature of data (e.g., incoming latency-sensitive data such as speech and video) waiting or arriving in the queues 411. Owing to the speculative mode of operation, it may happen that a grant arrives for an empty VOQ 411. Such a grant is referred to as wasted. In a preferred embodiment, a line card 302 is eligible to send a speculative packet in any time slot in which it received a wasted grant.

In exemplary embodiments of the invention described below, if a line card 302 receives an acknowledgment, it checks whether the packet with the sequence number included in the acknowledgment is present in the retransmission queue 412 indicated by the output identifier also included in the acknowledgment. If this packet is not present, the acknowledgment is ignored. If it is present, an action is taken that may depend on a specific application of the present invention, for example, one integrating a reliable delivery scheme (see section "Reliable Delivery"). For instance, in an exemplary embodiment utilizing Selective Retry (SR), the acknowledged packet (if present) is dequeued from any position in the retransmission queue 412. In alternative exemplary embodiments (e.g., Go-Back-In (GBN), Stop & Wait (S&W)), the acknowledged packet would only be dequeued if it were at the head of a retransmission queue (GBN) or VOQ (S&W).

No Resequencing at Egress

Figure 5:
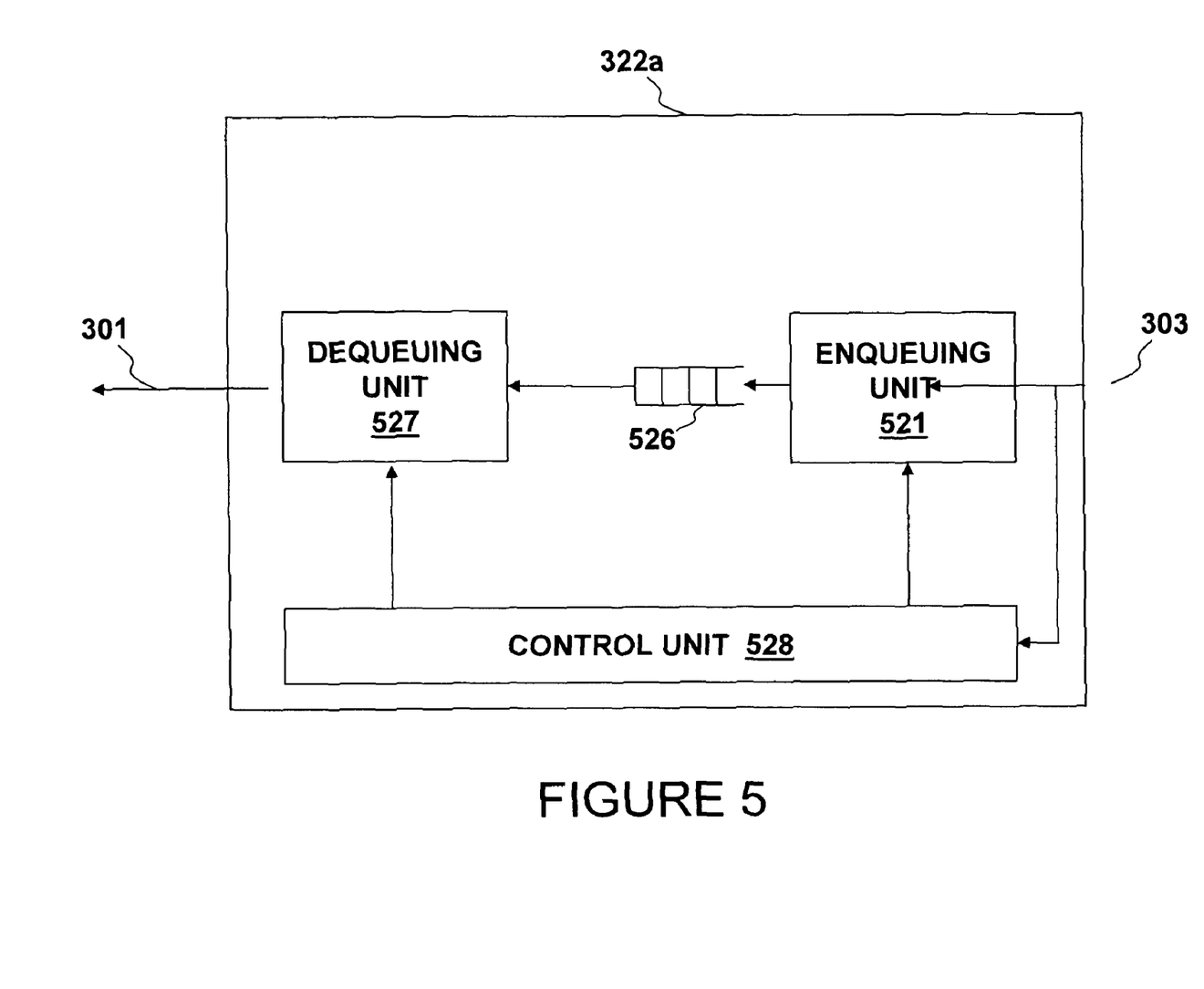
FIG. 5 shows an example of an egress buffer unit of a line card in accordance with the present invention.

FIG. 5 depicts an example of the egress buffer unit 322a of a line card 302 in which no resequencing is performed. Buffer unit 322a can be employed in conjunction with RD schemes that require no resequencing, such as Stop & Wait or Go-Back-N (described later). The egress buffer unit 322a includes an enqueuing unit 521, an output queue 526, a dequeuing unit 527, and a control unit 528.

In operation, packets arrive at the egress buffer unit 322a along data link 303. The control section 528 inspects the packet header and decides whether enqueuing unit 521 should store the packet in output queue 526 or drop the packet. When a Stop & Wait or a Go-Back-N RD scheme is used, packets are only accepted in the correct order. It is to be understood, however, that even with Stop & Wait duplicate deliveries may occur, whereas with GBN duplicate and out-of-order deliveries may occur. Therefore, the control unit 528 maintains the next expected sequence number for every input. The control unit 528 checks whether the sequence number of the packet received equals the next expected sequence number for the corresponding input (e.g., the sequence number of the last successfully received packet plus one). If this is the case (i.e., the expected and received sequence numbers are equal), the packet is enqueued in the output queue 526. Otherwise, the packet is dropped because it is either a duplicate (e.g., sequence number too low) or out of order (e.g., sequence number too high).

The dequeuing unit 527 dequeues a packet, if present, from output queue 526 and transmits it on the external data link 301.

With Resequencing at Egress

Figure 6A:
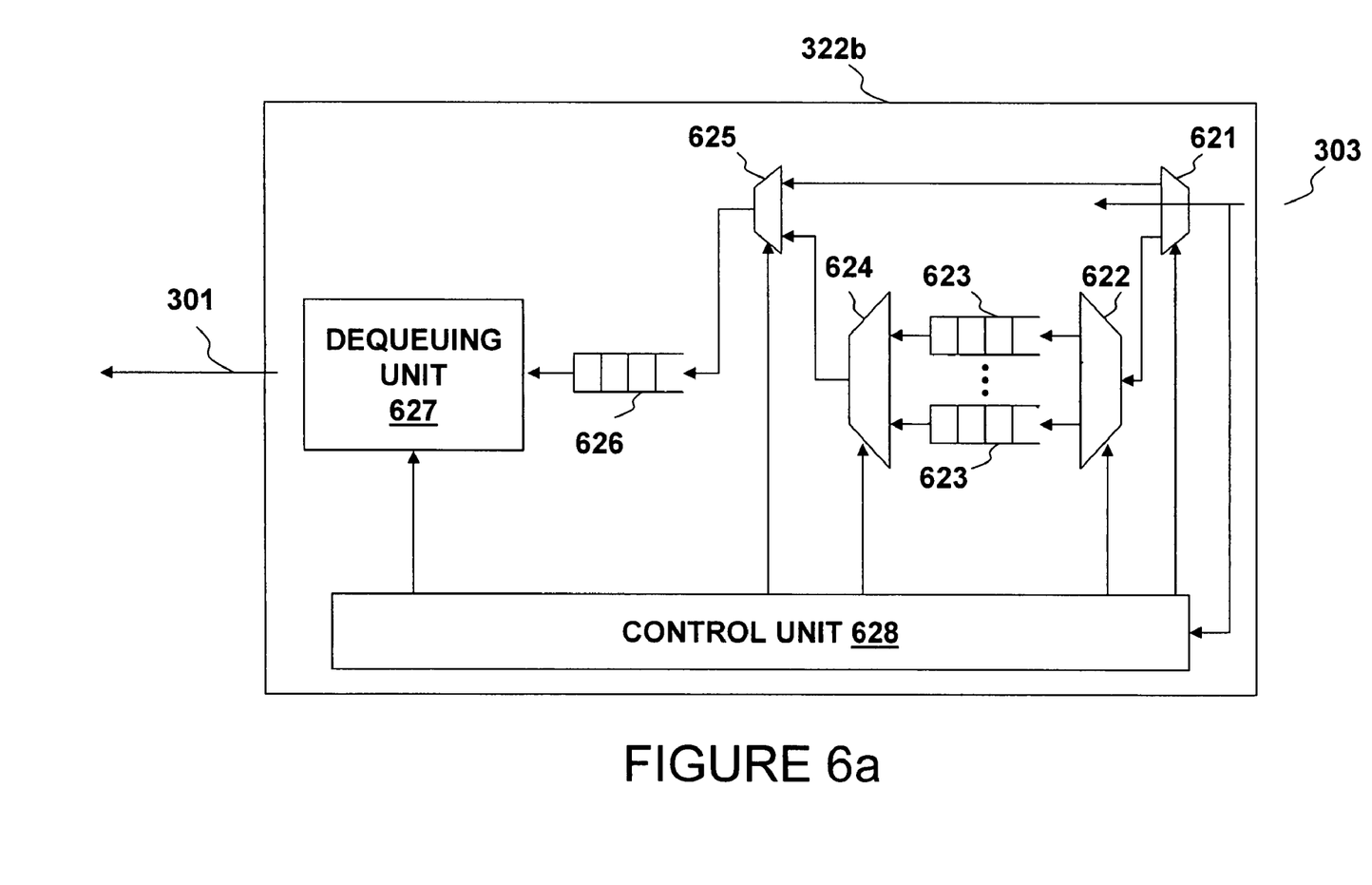
FIG. 6a shows another example of egress buffer unit of a line card in accordance with the present invention.

FIG. 6a depicts another exemplary embodiment of the egress buffer unit 322b of a line card 302. This embodiment should be employed in conjunction with RD schemes that require resequencing, such as Selective Retry. It comprises a demux 621, a demux 622, a plurality of resequencing (RSQ) queues 623, one for every input, a mux 624, a mux 625, an output queue 626, a dequeuing unit 627, and a control unit 628.

In operation, egress buffer unit 322b receives packets on data link 303. The control unit 628 checks whether an arriving packet is in order (i.e., whether its sequence number is equal to the next expected sequence number for the corresponding input). If this is the case, the packet is routed via demux 621 and mux 625 and enqueued directly in the output queue 626 and the expected next sequence number is incremented. It is to be understood that a value of a next expected number depends on a particular type of sequencing scheme chosen. For example, in one exemplary embodiment described below, packet sequence numbers are numbered using integers incremented by one for each next packet in an expected order. Of course, resequencing may be performed using any one of a number of other sequencing schemes, such as one in which numbers decrement in a sequence order, and/or ones in which a packet sequence number increments or decrements by a value other than one. If the packet arrives out of order (e.g., its sequence number is larger than the next expected sequence number for the corresponding input), it is routed via demux 621 and demux 622 to the resequencing queue 623 corresponding to its input. Therefore, the resequencing queues 625 store all packets that arrive out of order. These packets are only allowed to proceed to the output queue 626 when all preceding packets have been correctly received. If the packet is a duplicate (e.g., its sequence number is smaller than the next expected sequence number for the corresponding input) it is dropped. Duplicates of packets in the resequencing queues are not dropped according to this policy and will simply overwrite the copy already stored.

Whenever an in-order packet arrives, the control section 628 checks whether this in-order arrival enables packets to be dequeued from the corresponding resequencing queue 623. If this is the case, one or more of such packets are dequeued from the resequencing queue 623, routed via mux 624 and mux 625, and enqueued in the output queue 626 and the next expected sequence number for the corresponding input is updated.

Figure 6B:
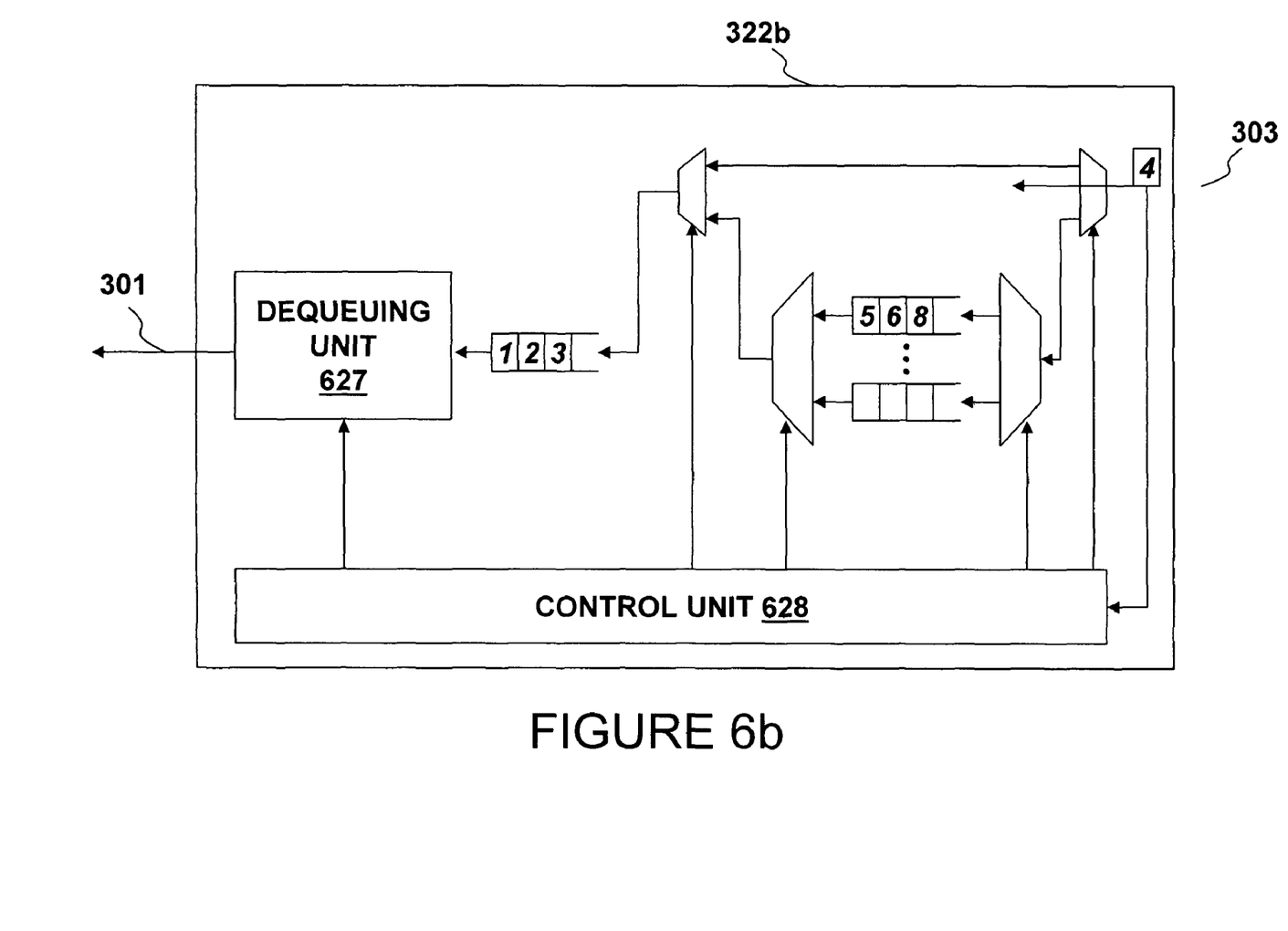

FIG. 6b presents an example of resequencing at the egress buffer unit 322b. For data link 301 and a specific input line card 302, all packets up to and including sequence number 3 have been correctly received. Additionally, packets numbered 5, 6, and 8 have been correctly received, but out of order. Therefore, packets 5, 6 and 8 have been stored in the resequencing queue 623 for data link 301. Next, packet 4 arrives and is immediately routed to the output queue 626 because it corresponds to the next expected sequence number. Additionally, packets 5 and 6, but not packet 8, can now be dequeued from the resequencing buffer 623 and enqueued in the output queue 626. When this has been done, the next expected sequence number for data link 301 is equal to 7.

The dequeuing unit 627 dequeues a packet, if present, from the output queue 626 and transmits it on the external data link 301.

Figure 7:
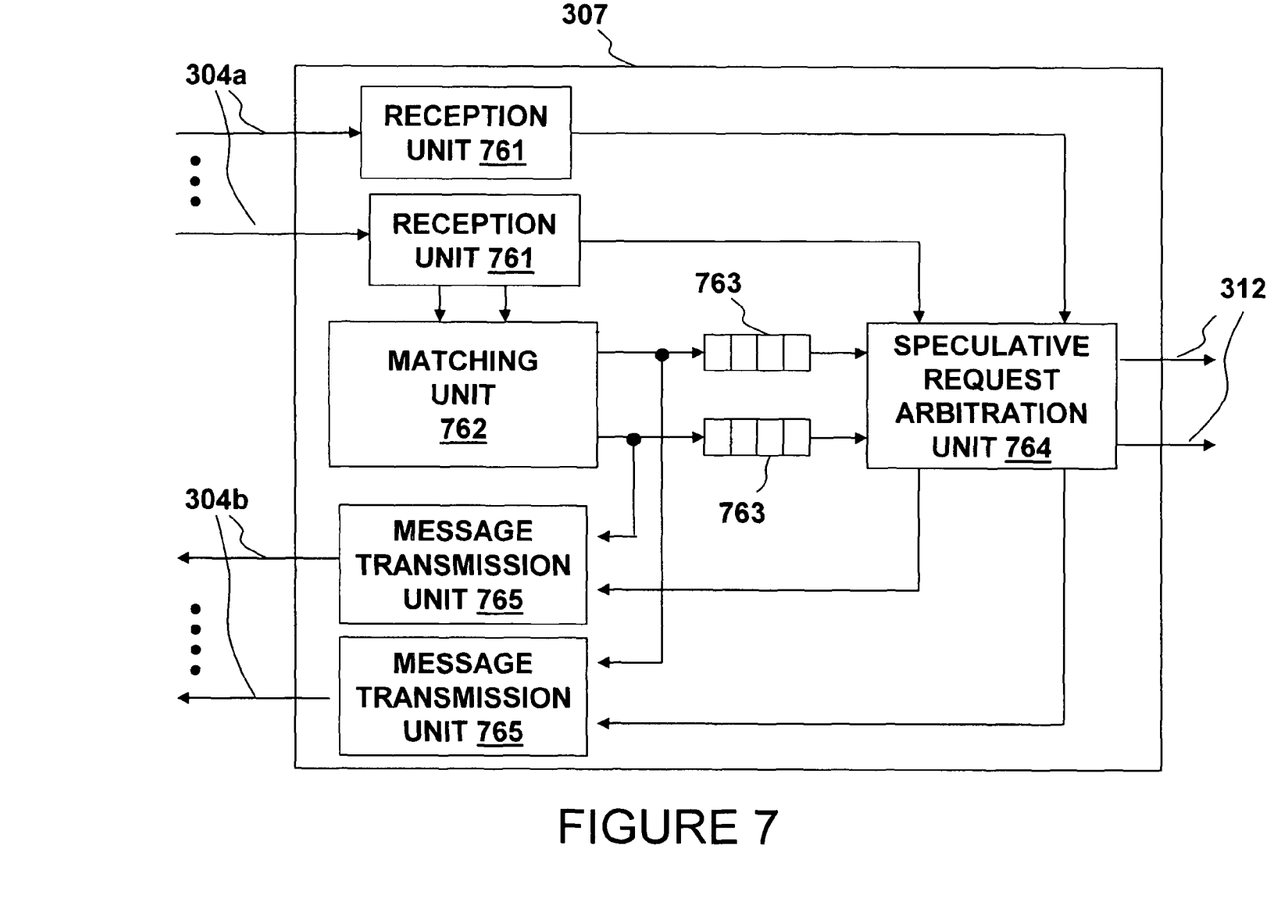
FIG. 7 is a schematic representation of an exemplary arbiter unit in accordance with the present invention.

FIG. 7 shows a schematic representation of an exemplary arbiter unit 307. It includes a plurality of control message reception units 761, one for every input control link 304a, a matching unit 762, a plurality of matching delay lines 763, one for every input, a speculative request arbitration unit 764, and a plurality of control message transmission units 765, one for every output control link 304b.

As shown in FIG. 7, the arbiter unit 307 receives control messages from control links 304a. The control message reception units 761 decode the incoming control messages. Decoded scheduled arbitration requests are forwarded to the matching unit 762, and decoded speculative requests are forwarded to the speculative request arbitration unit 764. Matching unit 762 computes a one-to-one matching between inputs and outputs according to a suitable known matching algorithm, such as PIM, i-SLIP (see, N. McKeown, "Scheduling Algorithms for Input-Queued Switches," PhD. Thesis, University of California at Berkeley, 1995), or Dual Round-Robin Matching (DRRM) algorithms. Because such algorithms are known to those skilled in the art, a detailed description thereof is omitted for brevity. The newly computed matching is forwarded to the control message transmission units 765 and the matching delay lines 763. The delay lines 763 delay a matching for a predetermined time to synchronize the configuration of the crossbar with the arrival of the corresponding packets. In practice, this delay is equal to the round-trip time, which includes the time it takes for the grant to travel to the line card plus the time it takes for the packet to travel to the crossbar, including serialization and deserialization delays, transmission delays, and time of flight, minus the time it takes to send the configuration information to the routing fabric and configure it accordingly.

The speculative request arbitration unit 764 receives as inputs the current matching of the scheduled arbitration transmission requests to be applied to the crossbar and the current speculative requests. It denies all speculative requests corresponding to an output already matched in the current matching, i.e., scheduled arbitration transmissions always take precedence over speculative ones to ensure high maximum throughput. For every unmatched output for which there is at least one speculative request, speculative request arbitration unit 764 selects one to grant according to some policy (e.g., round robin) and denies all others. It sends an acknowledgment (ACK) corresponding to every successful speculative transmission request to the control message transmission unit 765 corresponding to the input that sent the request. Optionally, speculative request arbitration unit 764 sends a negative acknowledgment (NAK) corresponding to each denied speculative transmission request. The successful speculative transmission requests are added to the matching and the result is applied to the crossbar via crossbar configuration links 312.

Each control message transmission unit 765 assembles a control message for its corresponding line card 302 and sends it to the line card 302 via control link 304b. The control message may include new arbitrated grants (if present) and acknowledgments for successful speculative transmissions (if present)

In general, the use of speculative transmission can cause out-of-order arrival of packets at the egress buffer unit 322, because out of a sequence of in-flight speculative packets, one or more may be lost due to collisions. Therefore, depending on the specific RD scheme, the egress buffer unit 322 may need to perform a sequence check and/or resequencing.

Reliable Delivery

The STX mode of operation implies that packets transmitted by speculative arbitration may collide with either other speculative packets or with packets transmitted by way of scheduled arbitration. If a collision occurs, one or more packets must be dropped, resulting in lossy switching operation even in the absence of errors. Additional measures can be taken to ensure reliable, correct, single-copy, in-order delivery. For instance, the present invention may be integrated with a number of reliable delivery (RD) schemes to increase system reliability. In general, such schemes operate by keeping packets stored at the sender until an acknowledgment (ACK) is received indicating that the receiver has correctly received a specific packet. Retransmissions are generally triggered either implicitly by timeouts or explicitly by negative acknowledgements (NAKs). Depending on the specific implementation, sequence numbers are needed to identify specific packets and/or resequencing buffers are needed at the egress to restore the correct packet order.

For example, STX arbitration in combination with scheduled arbitration may be integrated with known Stop & Wait (S&W), Go-Back-N (GBN), and Selective Retry (SR) RD schemes to increase reliable, in-order delivery in the presence of speculative transmission. These exemplary schemes are now described:

Stop & Wait

In the case of Stop & Wait (S&W), only one unacknowledged packet per output is allowed to be outstanding at each input at any given time. The next packet for this input-output pair can only be transmitted when either a grant for the corresponding output arrives at the input, or the corresponding acknowledgment arrives. In this case, the packets, the speculative transmission requests, and acknowledgments carry an indicator, for example, a one-bit sequence number, to allow detection of duplicates. For example, an egress buffer unit can check the sequence number (e.g., sequence numbers that are in sequence must alternate) and enqueue the packet if OK (i.e., in sequence), and otherwise drop the packet. FIG. 5, for example, shows an egress buffer unit 322a implemented without resequencing.

S&W is simple to implement and low in overhead. For instance, the physical implementation of a separate RTX queue is not necessary because the packet can remain at the head-of-line of the VOQ until acknowledged or granted. However, when the round-trip time is larger than one packet time, the expected latency improvement will be low because speculative transmission cannot be pipelined. This can be especially disadvantageous when traffic is bursty.

Go-Back-N

In the case of Go-Back-N (GBN), a predetermined maximum number of packets per output are allowed to be unacknowledged at each input at any given time. This number depends on the maximum allowed length of the retransmission queue 412. In GBN, the egress buffer unit can be implemented without resequencing, for example, according to egress buffer unit 322a of FIG. 5. However, a sequence check as described above would be required because packets are accepted only if in the correct order. That is, all out-of-order packets are dropped. Additionally, acknowledgments also are accepted only if they are in order. For instance, when an ACK arrives, the ingress buffer unit 321 checks whether this ACK corresponds to the head-of-line packet of the corresponding retransmission queue 412. If the sequence numbers match and the most recent preceding successful transmission for the same VOQ 411 have occurred at least one RT ago, the packet is dequeued and dropped because it has been successfully delivered. If the sequence numbers do not match, the ACK is ignored. The additional condition on the last successful transmission (which may have been a packet transmission resulting from either a scheduled arbitration or a speculative arbitration) is required to cope with a possible scenario in which a successful speculative transmission may still be dropped later at the egress buffer 322a because it arrived out of order as a result of an earlier speculative transmission failure. In that case, the ACK would be a false positive.

This implies that when the first in a sequence of (pipelined) STX requests fails, causing a gap in the corresponding sequence of ACKs, all subsequent ACKs must be ignored until the failed packet has been successfully delivered. Consequently, all packets in the RTX queue must be retransmitted when an ACK is missing, hence the name Go-Back-N. A new STX request can only be issued when the RTX queue is not full.

GBN is more complex to implement than S&W. The additional complexity arises in part from an RTX queue having a first-in-first-out (FIFO) organization. The extra overhead may include longer sequence numbers on the packets, the STX requests and acknowledgments. The ingress buffer also can be implemented in a different fashion (e.g., a shift-register RTX queue plus additional NAK queue).

On the other hand, use of GBN may be better suited than S&W in systems that have a large round trip. For instance, GBN allows many packets to be sent speculatively back-to-back, which is not possible with an S&W scheme.

Selective Retry

Selective Retry (SR) allows a predetermined maximum number of packets per output to be unacknowledged at each input at any given time. This number depends on the maximum allowed length of the retransmission queue 412 and the maximum allowed length of the resequencing queue 623. The egress buffer unit may be implemented according to the egress buffer unit 322b shown in FIGS. 6a and 6b, for example, which allows for accepting packets out-of-order and resequencing as described above. The ingress buffer unit 321 also accepts acknowledgments in any order. This implies that only the failed STX packets are retransmitted, hence the name Selective Retry, as opposed to retransmitting the whole RTX queue as with GBN.

SR is significantly more complex to implement than GBN because of the added complexity of a plurality of resequencing queues at the egress buffer unit 322. Additionally, an RTX queue in SR requires a random-access organization because packets can be dequeued from any point in the queue and not just from the head of line.

Retransmission and Resequencing Buffer Sizing

In general, it is advantageous to dimension the retransmission buffer such that at least a full round-trip's worth of packets can be transmitted speculatively in order to obtain the maximum advantage in terms of latency reduction. In this case, the links can be utilized at 100% with speculative transmissions.

To achieve optimal advantage, a preferred embodiment dimensions every resequencing queue (RSQ) such that it can store at least a number of packets equal to the RTX queue corresponding to the RSQ buffer. For example, the size of RSQ 623 may be determined based on the difference between the sequence number of the head-of-line packet of the RTX queue, for example, the RTX queue 412 corresponding to the RSQ 623 and sequence number of the tail packet of the RTX queue 412 corresponding to the RSQ 623.

Speculation in Asymmetric Routing Fabrics

The above examples of the invention generally show a "square" crossbar-like routing fabric (i.e., a fabric having the same number of inputs and outputs). While it is typical for boards, such as line cards and the like, to be connected to one fabric input and one fabric output, the present invention also may be implemented with switch fabrics featuring more outputs than inputs. For instance, assuming that there are K times as many outputs than inputs, with K integer and greater than one, exactly K routing fabric outputs can be assigned to every egress line card. This enables every egress line card to receive up to K packets in every time slot.

Figure 8:
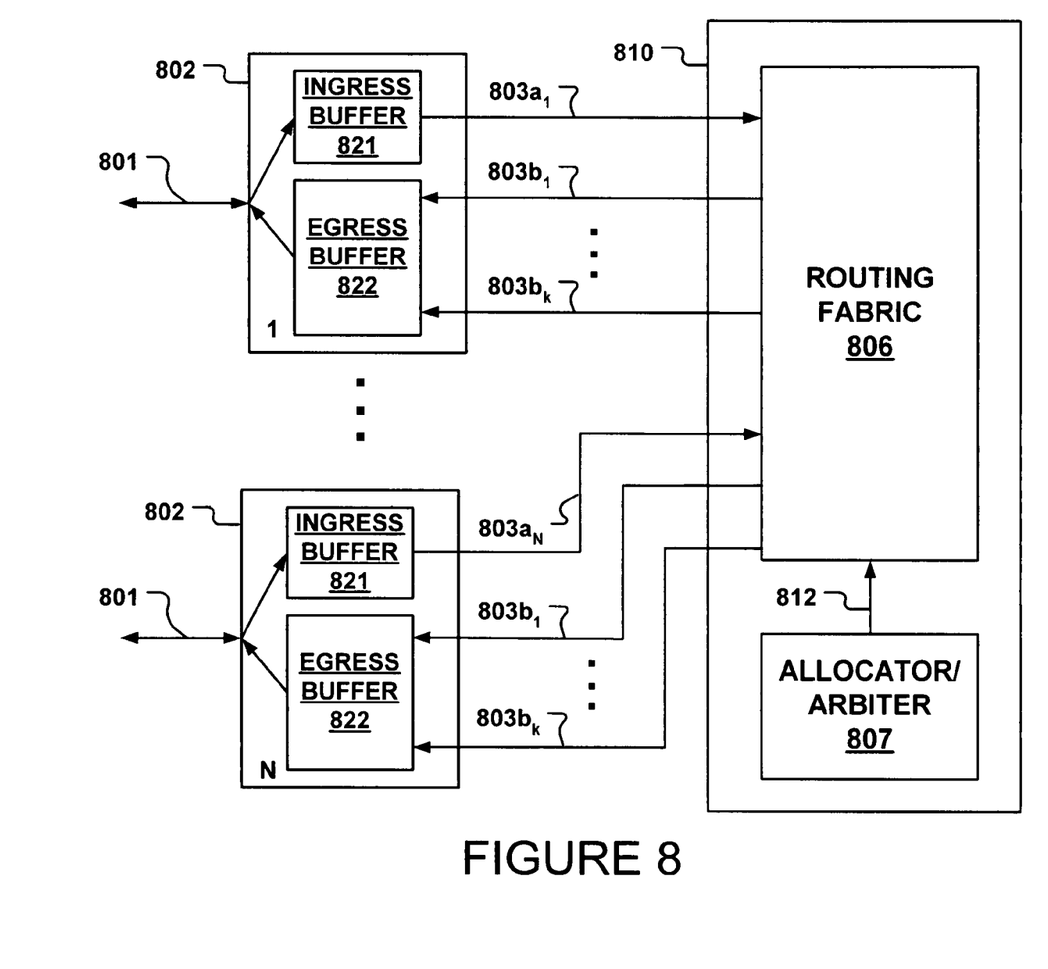
FIG. 8 shows another exemplary system in accordance with the present invention.

FIG. 8 shows an exemplary system including an asymmetric routing fabric. As shown in FIG. 8, the system comprises a switch core 810, N ingress data links $803a_1$ to $803a_N$, each being provided between respective outputs of an ingress buffer 821 of one of N line cards 802, and data links $803b_1$ to $803b_K$ provided between the routing fabric 806 and each egress buffers 822. Thus, there is a total of N·K data links $803b_x$, where x is between 1 and k, output from the routing fabric 806 of switch core 810. Control links similar to those discussed above exist between the switch core 810 and lines cards 802, however, control links are not shown for the sake of brevity.

Switch core 810 includes the routing fabric 806 and an arbiter 807 for determining a conflict-free allocation of the switching fabric resources for a group or subgroup of requests for scheduled and/or speculative arbitration to provide a suitable matching between input and output ports. A configuration link 812 provides a switching configuration determined by the arbiter 807 to the routing fabric 806. As noted above, each egress 822 is provided with K times as many outputs from the routing fabric than the number of inputs from the line cards 802. For example, in a system implementing asymmetry with K=2, the egress buffer 822 would have one additional data link (output from the switching fabric) that can receive a packet from any one of the switching fabric inputs. To handle the increase in data packets received in any time period or cycle, queues in egress buffer 822 are dimensioned according to the load and/or various constraints. Also, the egress buffers 822 preferably have K times the write bandwidth.

In the exemplary system of FIG. 8, data packets having payload information and a header including information indicating the requested packet destination are transmitted and received over N bi-directional full-duplex ingress/egress data links 801. Received data packets are dequeued from ingress buffers 821 and transmitted over the data links $803a_1$ to $803a_N$ to inputs of the routing fabric 806. Because each line card 802 also can receive up to K outputs from among the remaining N−1 line cards, the routing fabric 806 of the asymmetric example of the present invention can, for example, match one packet transmitted by way of scheduled arbitration and/or by way of speculative arbitration by each of the N line cards 802 to one of the $803b_x$ data lines output to the egress buffer 822 of any other line card 802. Thus, each line card 820 can receive up to K packets, which may include packets transmitted by way of scheduled or speculative arbitration, or a combination thereof transmitted from the other N−1 line cards 802.

This feature can be advantageously utilized to either allow multiple scheduled arbitration transmissions, multiple speculative transmissions, or a combination of both to be accepted by every egress in any time slot. In an embodiment of the invention, for example, this feature can be exploited to great advantage of the speculative transmission scheme. For instance, in a given time slot, if there is no scheduled arbitration transmission, every egress 822 can accept up to K speculative transmissions. If there is one scheduled arbitration transmission, every egress 822 can accept up to K−1 speculative transmissions. In this example, scheduled arbitration transmissions can still form a one-to-one matching between inputs and outputs, and speculative arbitration transmissions can take advantage of all remaining fabric output bandwidth. In this way, it can be ensured that speculative transmissions have a significantly higher probability of being successful, thus achieving considerably higher latency reductions (depending on the load).

Existing one-to-one matching algorithms would require minimal or no modifications to implement the asymmetric example of present invention. However, it is to be understood that a number of schemes may be employed to match routing fabric inputs to outputs with respect to types of transmitted packets and/or a number of each type of transmitted packets.

To handle up to K speculative requests/acknowledgments per output per time slot, the speculative request arbitration unit 764 of FIG. 7 must be modified. First, it must determine for every output the maximum number of speculative requests that can be acknowledged. For all outputs which are already matched in the current matching, this maximum number equals K−1. For all other outputs, this maximum number equals K. Next, the speculative request arbitration unit 764 makes a selection among the speculative requests received per output, choosing up to the determined maximum number of winners, and denying all others. This selection is preferably performed in a round-robin fashion for fairness, but may be performed in other ways as well.

The present invention finds application in interconnection networks, such as parallel computing applications, including high-performance computing systems, clusters, and IO networks, where low latency is desired or required, as it has a direct impact on the computing performance of the system as a whole. The invention may be used with routing fabrics that include electrically controlled electrical switches, electrically controlled optical switches, and optically controlled optical switches.

To facilitate an understanding of the invention, many aspects of the invention have been described in terms of sequences of actions to be performed by elements of an interconnection system. It will be recognized that, in each of the exemplary embodiments, the various actions could be performed by specialized circuits (e.g., discrete logic gates interconnected to perform a specialized function), by program instructions being executed by one or more processors, or by a combination of both. Moreover, the invention can additionally be considered to be embodied within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention.

In the examples described above, a board (e.g., a line card) is eligible to perform speculative transmission only when it does not receive a grant for a given time slot. However, in applications where the effective capacity of the link to the crossbar exceeds that of the external link such that multiple packets can be sent in one time slot, the spare capacity could be used to perform speculative and granted transmissions in the same time slot.

The invention has been described with reference to particular embodiments. However, it will be apparent to those skilled in the art that various changes and modifications can be made in the present invention without departing from the spirit and scope thereof. Thus, it is intended that the present invention cover the modifications of this invention provided they come within the scope of the appended claims and their equivalents.

What is claimed is:

1. A method for transmitting data packets with and without prior grant of access from a plurality of inputs to a plurality of outputs of a routing fabric, the transmission method comprising the steps of:
   if a prior grant of access is present, sending at least one data packet according to the prior grant of access; and
   if no prior grant of access is present:
      selecting a data packet to transmit speculatively; and
      simultaneously issuing a speculative request that includes an output identifier of the selected data packet and sending the selected packet to the routing fabric, wherein the speculatively issued request is resolved against other requests, resulting in a transmission grant issued to the routing fabric synchronously with the arrival of the speculatively issued data packet transmitted such that a switch state for the routing fabric is set just in time to allow unimpeded passage of the data packet across the fabric.

2. The method according to claim 1, further comprising the step of storing the selected data packet until either an acknowledgment or a grant for the stored packet is received.

3. The method according to claim 1, wherein the routing fabric is unbuffered.

4. The method according to claim 1, further comprising the steps of
   for every time slot, matching inputs to outputs of the routing fabric according to a prior arbitration result; and
   for every unmatched output, in a time slot in which the matched inputs and outputs are to be applied to the routing fabric, selecting one issued speculative request, if present, according to a selection policy; and
   adding input-output mapping for each winning speculative request to the current prior arbitration result to be applied to the routing fabric.

5. The method according to claim 4, comprising the step of returning an acknowledgment corresponding to every winning selected speculative request.

6. The method according to claim 1, wherein the routing fabric is one of an electrically controlled electrical switch, an electrically controlled optical switch, and an optically controlled optical switch.

7. The method according to claim 1, further comprising the steps of:
   receiving a data packet from an output of the routing fabric;
   comparing a sequence value contained in the data packet with a next expected value; and
   enqueuing the received packet if the sequence value is equal to the next expected value.

8. The method according to claim 7, further comprising the step of dropping the packet if the sequence value and next expected value are not equal.

9. The method of claim 7, further comprising the steps of:
   storing the received packet if the sequence value and next expected value are not equal; and
   enqueuing the received packet only after receiving and enqueuing all packets having corresponding sequence values less than the received data packet sequence value.

10. A system for transmitting data packets with and without prior grant of access from a plurality of inputs to a plurality of outputs of a routing fabric, comprising:
    means for sending at least one data packet according to the result of a prior grant of access, if a prior grant of access is present; and
    means for selecting a data packet to transmit speculatively, and simultaneously issuing a speculative request that includes an output identifier of the selected data packet and sending the selected packet to the routing fabric, if no prior grant of access is present,
    wherein a request speculatively issued to the routing fabric is resolved against other requests, resulting in a transmission grant that is issued to the routing fabric synchronously with the arrival of the speculatively issued data packet such that the switch state is set just in time to allow unimpeded passage of the data packet across the fabric.

11. A system according to claim 10, wherein the routing fabric is one of an electrically controlled electrical switch, an electrically controlled optical switch, and an optically controlled optical switch.

12. A system according to claim 10, wherein the means for sending at least one data packet is physically separated from an arbiter that performs said prior arbitration such that signal propagation and other time delays associated with any one or more of forwarding transmission requests to the arbiter, the arbitration function itself, or transmission of a data packet to the routing fabric, is larger than the transmission time of a packet.

13. A system for managing the flow of information units among plural locations, comprising:
    a plurality of inputs for receiving requests for access to a switching fabric to transmit information units from source locations to destination locations, said requests including requests for grant of access prior to transmission for some transmissions and requests for speculative access for transmission without prior grant for other transmissions, and each said requests including indication of a destination location to which to transfer an associated information unit;
    an arbiter for determining a conflict-free allocation of the switching fabric resources for a group or subgroup of the requests for transmission after prior granted access; and
    a speculative request arbiter for receiving said speculative access requests for transmission without prior grant, at a time in which the determined group is to be next applied to the switching fabric, and granting or denying said received request based on the determined allocation.

14. A system according to claim 13, wherein the switching fabric is one of an electrically controlled electrical switch, an electrically controlled optical switch, and an optically controlled optical switch.

15. A system according to claim 13, wherein an information unit associated with a granted one of said received speculative access request is passed through the switching fabric to an output not reserved for the group or subgroup.

16. A system according to claim 13, wherein the switching fabric does not include buffer circuitry for storing the information units.

17. A system according to claim 13, wherein for every granted speculative request, the speculative request arbiter sends an acknowledgment message to the sender of the speculative request.

18. A system according to claim 13, wherein each of the plurality of inputs of the switching fabric is connectable, simultaneously, with a respective output of the switching fabric.

19. A method for transmitting data packets with and without prior grant of access from a plurality of inputs to a plurality of outputs of a routing fabric, the transmission method comprising the steps of:
    if a prior grant of access is present, sending at least one data packet according to the prior grant of access; and
    if no prior grant of access is present:
       selecting a data packet to transmit speculatively; and
       simultaneously issuing a speculative request that includes an output identifier of the selected data packet and sending the selected packet to the routing fabric; and
       for every time slot, matching inputs to outputs of the routing fabric according to a prior arbitration result; and
       for every unmatched output, in a time slot in which the matched inputs and outputs are to be applied to the routing fabric, selecting one issued speculative request, if present, according to a selection policy; and
       adding input-output mapping for each winning speculative request to the current prior arbitration result to be applied to the routing fabric.

* * * * *